United States Patent
Kiyokawa et al.

(10) Patent No.: US 10,318,745 B2
(45) Date of Patent: Jun. 11, 2019

(54) ACCESS CONTROL SYSTEM AND ACCESS CONTROL METHOD

(71) Applicant: Hitachi Solutions, Ltd., Tokyo (JP)

(72) Inventors: Yuuichi Kiyokawa, Tokyo (JP); Kouji Inoue, Tokyo (JP); Ryuuji Nakayama, Tokyo (JP); Hiroyuki Ota, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 164 days.

(21) Appl. No.: 15/505,949

(22) PCT Filed: Jan. 6, 2016

(86) PCT No.: PCT/JP2016/050210
§ 371 (c)(1),
(2) Date: Feb. 23, 2017

(87) PCT Pub. No.: WO2016/152181
PCT Pub. Date: Sep. 29, 2016

(65) Prior Publication Data
US 2018/0225465 A1 Aug. 9, 2018

Related U.S. Application Data

(63) Continuation of application No. PCT/JP2016/050210, filed on Jan. 6, 2016.

(30) Foreign Application Priority Data

Mar. 25, 2015 (JP) .................................. 2015-062999

(51) Int. Cl.
*H04L 29/06* (2006.01)
*G06F 21/62* (2013.01)
(Continued)

(52) U.S. Cl.
CPC .......... *G06F 21/62* (2013.01); *G06F 11/3485* (2013.01); *G06F 21/604* (2013.01);
(Continued)

(58) Field of Classification Search
CPC .... G06F 21/62; G06F 21/604; G06F 11/3485; G06F 2221/2141; H04L 63/101
(Continued)

(56) References Cited

U.S. PATENT DOCUMENTS 6,343,324 B1 * 1/2002 Hubis .................... G06F 3/0622
709/229
6,484,245 B1 * 11/2002 Sanada .................. G06F 3/0622
711/111
(Continued)

FOREIGN PATENT DOCUMENTS

EP 1 443 729 A1 8/2004
JP 2007-041631 A 2/2007
(Continued)

OTHER PUBLICATIONS

International Search Report of PCT/JP2016/050210 dated Mar. 22, 2016.
(Continued)

*Primary Examiner* — Hosuk Song
(74) *Attorney, Agent, or Firm* — Mattingly & Malur, PC

(57) ABSTRACT

To provide a system for simplifying setting of access control for a file system and a firewall, it is provided an access control system, which is formed by a computer including a processor configured to execute a process, and a memory configured to store a program for executing the process, the access control system comprising: a launcher, which is a process configured to activate the process; an ACL file in which specifics for controlling an I/O request issued by the process are defined; a process search module configured to
(Continued)

trace a parent of the process to determine whether or not the process is an activated process that has originated from the launcher; and an access control module configured to control an I/O request issued by the activated process that has originated from the launcher in accordance with the specifics defined in the ACL file.

4 Claims, 6 Drawing Sheets

(51) Int. Cl.
*G06F 11/34* (2006.01)
*G06F 21/60* (2013.01)

(52) U.S. Cl.
CPC ...... *G06F 21/6218* (2013.01); *G06F 21/6281* (2013.01); *H04L 63/0236* (2013.01); *H04L 63/101* (2013.01); *G06F 2221/2141* (2013.01)

(58) Field of Classification Search
USPC ..................................... 726/26–30
See application file for complete search history.

(56) References Cited

U.S. PATENT DOCUMENTS

| | | | | |
|---|---|---|---|---|
| 7,130,978 B2* | 10/2006 | Kamano | ............... | G06F 3/0601 711/163 |
| 7,167,958 B2* | 1/2007 | Hashimoto | ............. | G06F 21/80 711/114 |
| 7,216,263 B2* | 5/2007 | Takaoka | .................. | G06F 3/061 709/224 |
| 7,478,244 B2* | 1/2009 | Yuriyama | ........... | G06F 21/6227 707/999.001 |
| 7,814,554 B1* | 10/2010 | Ragner | ................... | G06F 21/52 713/165 |
| 2004/0078568 A1 | 4/2004 | Pham et al. | | |
| 2007/0061867 A1 | 3/2007 | Shinohara et al. | | |
| 2011/0035783 A1 | 2/2011 | Terasaki et al. | | |

FOREIGN PATENT DOCUMENTS

| | | |
|---|---|---|
| JP | 2007-140798 A | 6/2007 |
| WO | 2009/110275 A1 | 9/2009 |
| WO | 2013/126615 A1 | 8/2013 |

OTHER PUBLICATIONS

Extended European Search Report received in corresponding European Application No. 167680842 dated Nov. 27, 2018.

* cited by examiner

| RULE NUMBER | COMMUNICATION SOURCE | COMMUNICATION DESTINATION | DEFINITION |
|---|---|---|---|
| 1 | LOCAL | LOCAL | ALLOW |
| 2 | LOCAL | 192.168.0.0/24 | ALLOW |
| 3 | LOCAL | ANY | DENY |
| 4 | ANY | LOCAL | DENY |
| 5 | LOCAL | 192.168.1.0/24 | CHANGE COMMUNICATION DESTINATION TO 192.168.0.0/24 |

| RULE NUMBER | ACCESS PATH | DEFINITION |
|---|---|---|
| 1 | C:¥PRIVATE¥ | DENY |
| 2 | C:¥PUBLIC¥ | ALLOW |
| 3 | C:¥SHADOW¥ | CHANGE ACCESS DESTINATION TO C:¥PUBLIC¥ |

*Fig. 3*

ACCESS CONTROL SYSTEM AND ACCESS CONTROL METHOD

CLAIM OF PRIORITY

The present application claims priority from Japanese patent application JP 2015-62999 filed on Mar. 25, 2015, the content of which is hereby incorporated by reference into this application.

BACKGROUND OF THE INVENTION

This invention relates to an access control system.

Hitherto, there has been known a technology for preventing unauthorized access from a malicious user or taking out of a confidential information file by setting, in a terminal, for example, a PC which handles confidential information files, a firewall or control of access to a file system in order to protect confidential information.

JP 2007-140798 A is given as the related art of this technology. In JP 2007-140798 A, there is disclosed a computer information leakage prevention system for prohibiting transfer of information stored in a storage unit, for example, a hard disk, to an application being executed on a computer when the application tries to access the information and a determination unit determines whether or not the access satisfies an access permission condition set in advance to result in determination of unauthorized access.

SUMMARY OF THE INVENTION

Meanwhile, integrated office software includes a plurality of applications such as a word processor and a spreadsheet, and thus handles various forms of files. Therefore, in a case where integrated office software is used to edit a confidential information file, the related art described above enables setting of access control in terms of filename extension. However, this setting requires an operator to grasp all the filename extensions handled by an application and complete all the necessary settings.

Further, in a case where communication through a network is controlled by a firewall, access control needs to be set for each of a communication destination, a communication program, and other programs.

It is an object of this invention to provide a system for simplifying setting of access control for a file system and a firewall as described above.

The representative one of inventions disclosed in this application is outlined as follows. There is provided an access control system, which is formed by a computer including a processor configured to execute a process, and a memory configured to store a program for executing the process, the access control system comprising: a launcher, which is a process configured to activate the process; an ACL file in which specifics for controlling an I/O request issued by the process are defined; a process search module configured to trace a parent of the process to determine whether or not the process is an activated process that has originated from the launcher; and an access control module configured to control an I/O request issued by the activated process that has originated from the launcher in accordance with the specifics defined in the ACL file.

According to the representative embodiment of this invention, it is possible to simplify setting of access control. Problems, configurations, and effects other than those described above are made clear from the following description of an embodiment of this invention.

BRIEF DESCRIPTION OF THE DRAWINGS

FIG. 3 is a diagram for illustrating a configuration example of the ACL file.

DETAILED DESCRIPTION OF THE PREFERRED EMBODIMENTS

In the following, a description is given in detail of a case where this invention is carried out with reference to the accompanying drawings.

Figure 1:
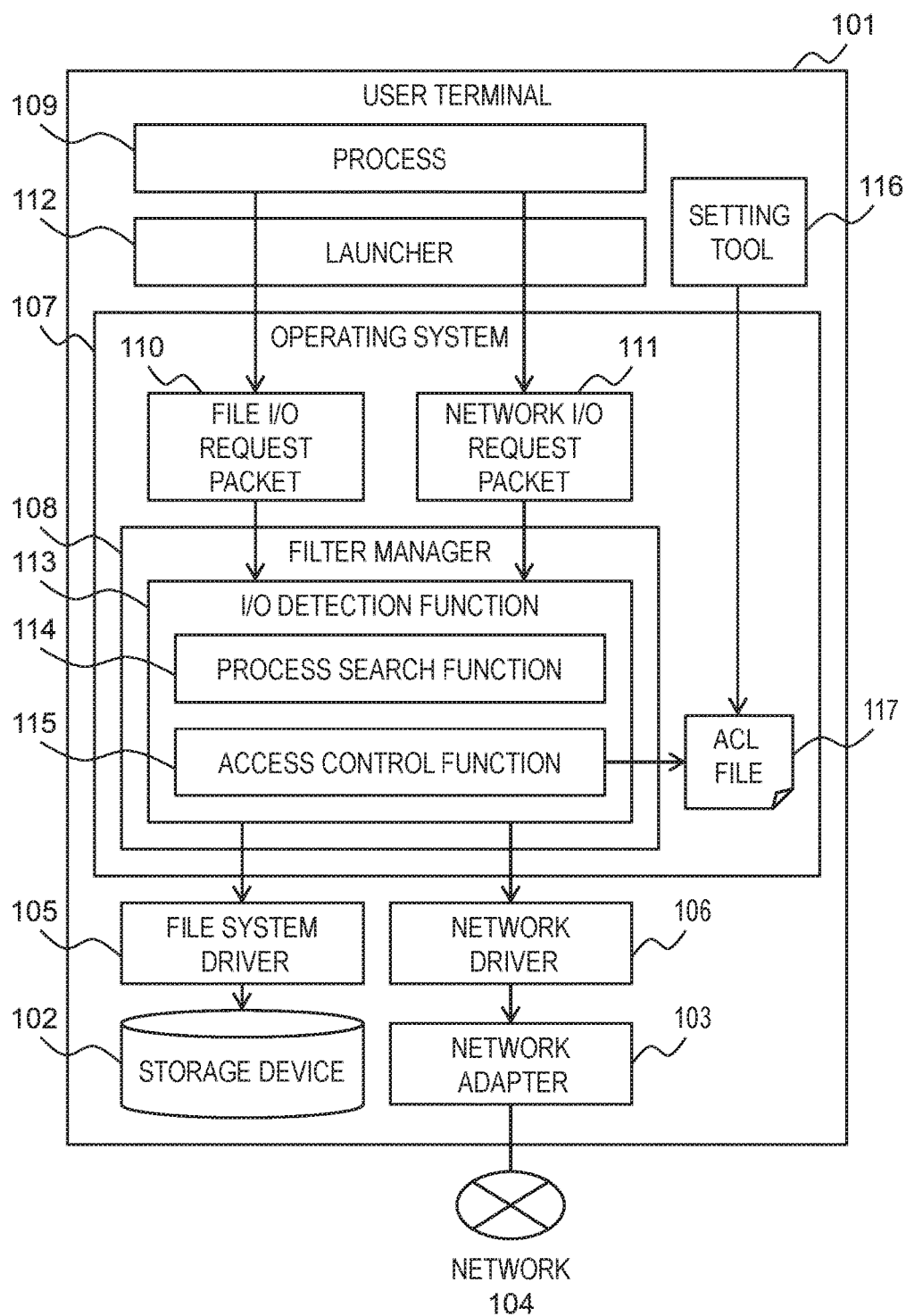
FIG. 1 is a diagram for illustrating a configuration of a system according to an embodiment of this invention.

FIG. 1 is a diagram for illustrating a configuration of a system according to an embodiment of this invention.

In FIG. 1, a user terminal 101 includes a storage device 102 and a network adapter 103. Further, an operating system 107, a file system driver 105, and a network driver 106 are installed in the user terminal 101. Further, the user terminal 101 includes, in the operating system 107, a filter manager 108 configured to filter a file I/O request packet 110 and a network I/O request packet 111 generated from a process 109. An I/O detection function 113 is registered with the filter manager 108. The I/O detection function 113 includes a process search function 114 and an access control function 115. Further, a launcher 112 and a setting tool 116 are installed in the user terminal 101.

The launcher 112 is configured to activate an arbitrary process 109. The I/O detection function 113 is configured to receive the file I/O request packet 110 and the network I/O request packet 111 through the filter manager 108. The process search function 114 is configured to confirm a parent process of the process 109, which is a transmission source, from a request packet received by the I/O detection function 113. The access control function 115 performs access control in accordance with an ACL file 117 in a case where the process search function 114 has confirmed that the parent process is the launcher 112. The setting tool 116 records, edits, and deletes access control settings in/from the ACL file 117.

When the user desires that the ACL file 117 be applied in a case where an arbitrary process 109 such as a word processor, a spreadsheet, or a web browser is activated, the user activates the process 109 from the launcher 112. In a case where the process 109 accesses a file or a network, the operating system 107 generates a packet containing process information on specifics of the access or the access source, and passes the packet to the file system driver 105 and the network driver 106 through the filter manager 108.

The filter manager 108 is configured to call the process search function 114 in the I/O detection function 113. The process search function 114 is configured to determine whether or not the process 109 has originated from the launcher 112 by searching for a parent process and a grandparent process of the process 109. In a case where the process search function 114 has determined that the process 109 has originated from the launcher 112, the filter manager 108 calls the access control function 115.

The access control function 115 is configured to perform access control, for example, allow, deny, or change the file I/O request packet 110 or the network I/O request packet 111, in accordance with the ACL file 117.

With the processing described above, access control of the ACL file 117 can be applied in bulk to all child processes and grandchild processes that have originated from the launcher 112.

Figure 2:
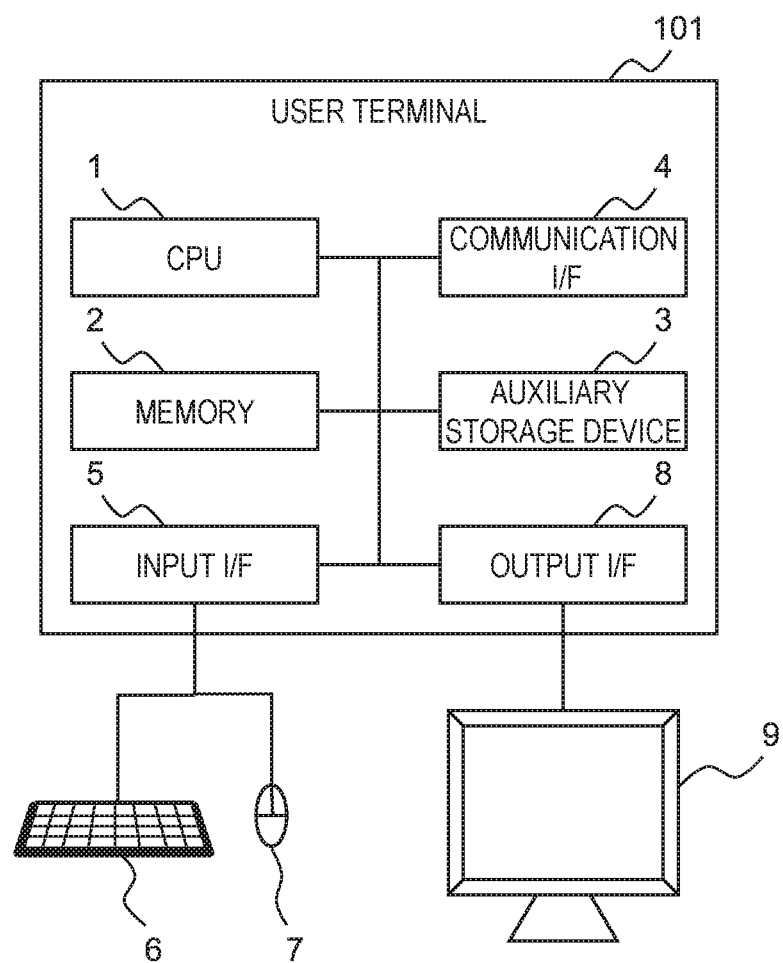
FIG. 2 is a block diagram for illustrating a physical configuration of the user terminal.

FIG. 2 is a block diagram for illustrating a physical configuration of the user terminal 101.

The user terminal 101 according to this embodiment is formed of a computer including a processor (CPU) 1, a memory 2, an auxiliary storage device 3, a communication interface 4, an input interface 5, and an output interface 8.

The processor 1 is configured to execute a program stored in the memory 2. The memory 2 includes a ROM, which is a nonvolatile storage element, and a RAM, which is a volatile storage element. The ROM is configured to store, for example, a fixed program (for example, a BIOS). The RAM is a fast and volatile storage element, for example, a dynamic random access memory (DRAM), and temporarily stores a program to be executed by the processor 1 and data to be used at the time of execution of a program.

The auxiliary storage device 3 is a large-capacity and non-volatile storage device such as a magnetic storage device (HDD) or a flash memory (SSD), and forms the storage device 102. Further, the auxiliary storage device 3 is configured to store a program to be executed by the processor 1. In other words, the program is read from the auxiliary storage device 3, loaded onto the memory 2, and executed by the processor 1.

The communication interface 4 is a network interface device configured to control communication to/from another apparatus (for example, a file server or a gateway) in accordance with a predetermined protocol.

The input interface 5 is an interface to which apparatus such as a keyboard 6 and a mouse 7 are coupled, and is configured to receive input from an operator. The output interface 8 is an interface to which apparatus such as a display apparatus 9 and a printer are coupled, and is configured to output a result of execution of a program in a format that is visually recognizable by the operator.

Programs to be executed by the processor 1 are provided to the user terminal 101 via removable media (for example, a CD-ROM and a flash memory) or a network, and are stored in the non-volatile auxiliary storage device 3, which is a non-transitory storage medium. Thus, it is desired that the user terminal 101 include an interface configured to read data from removable media.

The user terminal 101 is a computer system formed on one physical computer or on a plurality of logically or physically formed computers, and may operate as separate threads on the same computer, or operate on a virtual computer formed on a plurality of physical computer resources.

FIG. 3 is a diagram for illustrating a configuration example of the ACL file 117.

The ACL file 117 includes a network ACL 201 for defining a network access rule and a file ACL 202 for defining a file access rule.

The network ACL 201 includes a rule number 203 for uniquely identifying a rule, a communication source 204, a communication destination 205, and an access control definition 206.

In the communication source 204, network information on a communication source to which access control is applied, such as an IP address and a net mask, "LOCAL" indicating its own apparatus, and "ANY" indicating any one of relevant apparatus, is specified. In the communication destination 205, network information on a communication destination to which access control is applied, such as an IP address and a net mask, "LOCAL" indicating its own apparatus, and "ANY" indicating any one of relevant apparatus, is specified. In the definition 206, whether to allow or deny communication in a case where the relevant rule is satisfied is specified. Further, change of a communication destination to another address in a case where the relevant rule is satisfied can also be specified in the definition 206.

The file ACL 202 holds a rule number 207 for uniquely identifying a rule, an access path 208 for indicating a file or directory to be accessed, and an access control definition 209.

In the access path 208, a file path or a directory path to which access control is applied is specified as a character string. In the definition 209, whether to allow or deny access to a file or a directory in a case where the relevant rule is satisfied is specified. Further, change of an access path to another path in a case where the relevant rule is satisfied can also be specified in the definition 209.

Figure 4:
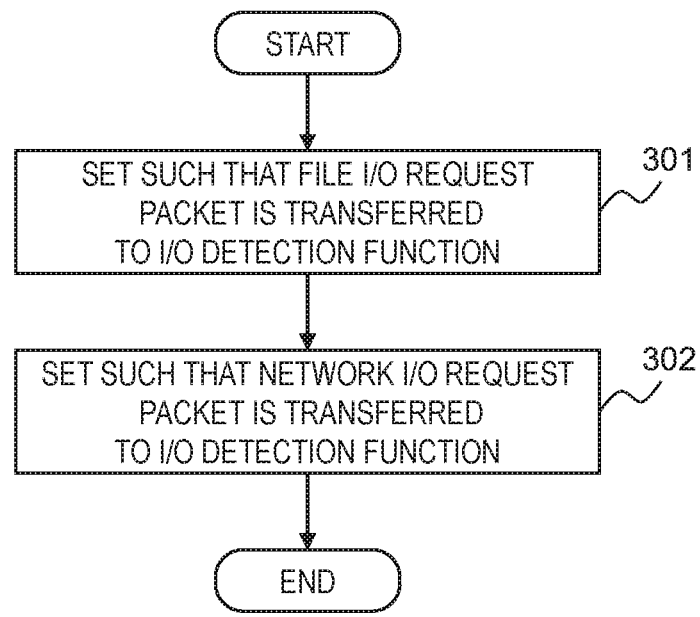
FIG. 4 is a flowchart for illustrating processing of registering the I/O detection function with the filter manager.

FIG. 4 is a flowchart for illustrating processing of registering the I/O detection function 113 with the filter manager 108.

The filter manager 108 is a function provided by the operating system 107. The operator gives an instruction to the operating system 107 to enable the file I/O request packet 110 or the network I/O request packet 111, which is processed by the operating system 107, to be passed to the I/O detection function 113 through the filter manager 108.

First, the filter manager 108 performs setting such that the file I/O request packet 110 is transferred to the I/O detection function 113 in accordance with an instruction given by the operator (Step 301). Then, the filter manager 108 performs setting such that the network I/O request packet 111 is transferred to the I/O detection function 113 in accordance with an instruction given by the operator (Step 302).

Figure 5:
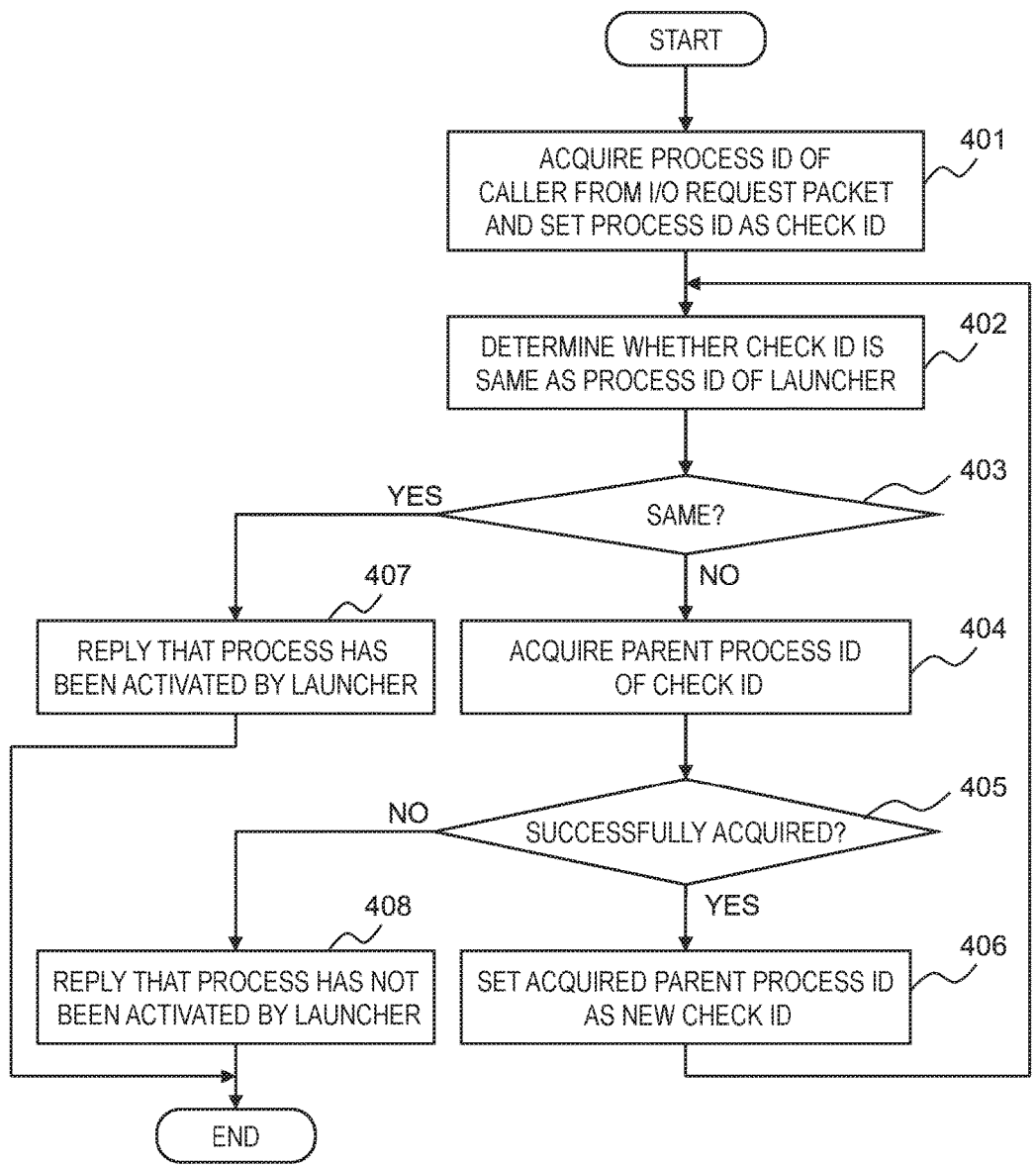
FIG. 5 is a flowchart for illustrating the process search function.

FIG. 5 is a flowchart for illustrating the process search function 114.

The process search function 114 is configured to execute processing of tracing the parent process of a process that has generated the file I/O request packet 110 or the network I/O request packet 111.

When the process search function 114 has received the file I/O request packet 110 or the network I/O request packet 111 from the filter manager 108 through the I/O detection function 113, the process search function 114 starts parent process search processing.

First, the process search function 114 acquires a process ID of the process 109 serving as a caller from the file I/O request packet 110 or the network I/O request packet 111, and sets the process ID as a check ID (Step 401).

Next, the process search function 114 determines whether or not the check ID acquired in Step 401 is the same as the process ID of the launcher 112 (Step 402).

In a case where the process search function 114 has determined in Step 402 that the check ID is the same as the process ID of the launcher 112 (YES in Step 403), the process search function 114 sends to the caller a reply indicating that the process 109 has been activated by the launcher 112, and ends the processing (Step 407).

On the contrary, in a case where the process search function 114 has determined that the check ID is not the same as the process ID of the launcher 112 (No in Step 403), the process search function 114 acquires the process ID of a parent process of the check ID (Step 404).

In a case where the process ID of the parent process has not been acquired (NO in Step 405), the process search function 114 sends to the caller a reply indicating that the process 109 has not been activated by the launcher 112 (Step 408), and ends the processing.

On the contrary, in a case where the process ID of the parent process has been acquired (YES in Step 405), the process search function 114 sets the process ID acquired in Step 404 as a new check ID (Step 406), returns to Step 402, and searches for a parent process further.

Figure 6:
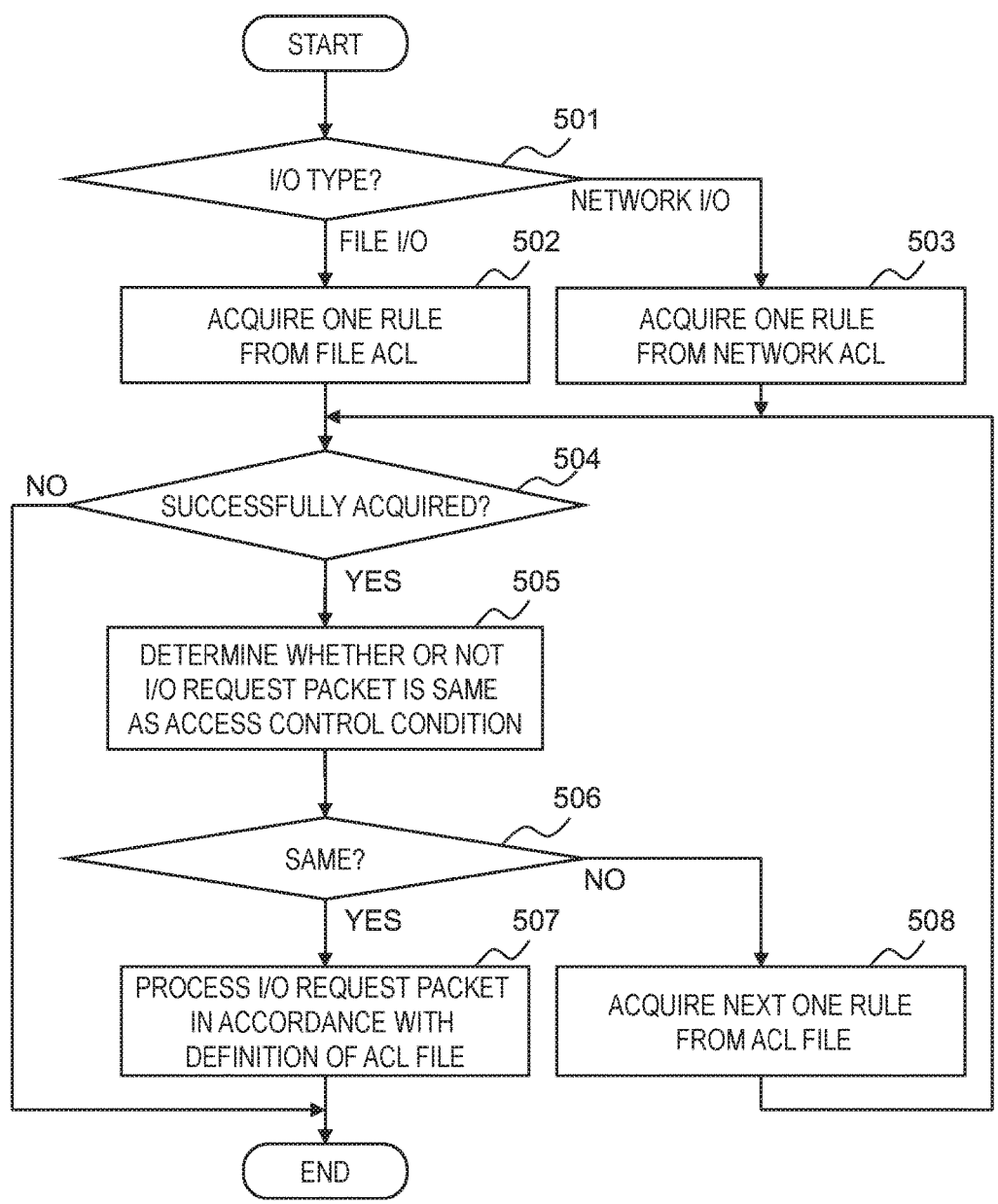
FIG. 6 is a flowchart for illustrating the access control function.

FIG. 6 is a flowchart for illustrating the access control function 115.

The access control function 115 is configured to execute access control of a network or a file.

As a result of Step 407, in a case where the process 109 serving as the caller is a process that has been activated by the launcher 112, the access control function 115 determines whether the I/O request packet relates to a file I/O or a network I/O in order to perform access control for the file I/O request packet 110 or the network I/O request packet 111 (Step 501).

In a case where the I/O request packet is the file I/O request packet 110, the access control function 115 acquires one rule from the file ACL 202 of the ACL file 117 (Step 502).

On the contrary, in a case where the I/O request packet is the network I/O request packet 111, the access control function 115 acquires one rule from the network ACL 201 of the ACL file 117 (Step 503).

In a case where no rule has been acquired in Step 502 and Step 503 (NO in Step 504), the access control function 115 ends the access control processing.

On the contrary, in a case where a rule has been acquired in Step 502 or Step 503 (YES in Step 504), the access control function 115 determines whether or not specifics (for example, a communication source, a communication destination, and an access pass) of the I/O request packet and the rule acquired in Step 502 or Step 503 (for example, the communication source 204, the communication destination 205, and the access path 208) are the same as each other (Step 505).

In a case where the specifics of the I/O request packet and the rule are the same as each other as a result (YES in Step 506), the access control function 115 updates the I/O request packet in accordance with the definition 206 or 209 of the ACL file 117 (Step 507), and ends the access control processing.

On the contrary, in a case where the specifics of the I/O request packet and the rule are not the same as each other (NO in Step 506), the access control function 115 acquires one next rule from the ACL file 117 (Step 508), returns to Step 504, and continues the processing.

With the method described above, it is possible to apply access control set in the ACL file 117 to all the processes 109 activated by the launcher 112 using a parent-child relationship of processes.

In a case where a plurality of rules correspond to the I/O request packet, it is desired that rules be registered with the ACL file 117 on a priority basis. Further, priorities may be defined in the ACL file 117, rules corresponding to the I/O request packet may all be selected, and access control definitions may be applied to the I/O request packet in accordance with the defined priorities.

As described above, according to the embodiment of this invention, there are provided the launcher 112 serving as a process configured to activate a process, the ACL file 202 that has defined specifics for controlling an I/O request issued by a process, the process search function 114 configured to trace the parent of an activated process to determine whether or not the process is an activated process that has originated from the launcher 112, and the access control function 115 configured to control an I/O request issued by the activated process that has originated from the launcher 112 in accordance with the specifics defined in the ACL file 202. Therefore, it is possible to uniquely control access to a network or a file system by activating a process to be secured with the launcher 112 through setting of access control in the filter manager 108 without requiring the user to set access control for each process or file.

Further, the process search function 114 acquires identification information on a process that has issued an I/O request, and in a case where the identification information on a process that has activated the process is the same as identification information on the launcher 112, the process search function 114 determines that the process that has issued an I/O request is an activated process that has originated from the launcher 112. On the contrary, in a case where the identification information on the process is different from the identification information on the launcher 112, the process search function 114 determines whether or not the identification information on the parent process is the same as the identification information on the launcher 112 by tracing the parent process. Therefore, it is possible to reliably determine an original process that has activated a process.

Further, the access control function 115 determines the type of an I/O request, and in a case where the I/O request is a file I/O request, the access control function 115 refers to the file ACL 202 to determine specifics for controlling the I/O depending on an access destination of the I/O request. On the contrary, in a case where the I/O request is a network I/O request, the access control function 115 refers to the network ACL 201 to determine specifics for controlling the I/O depending on the communication source and the communication destination of the I/O request. Therefore, it is possible to reliably apply different rules depending on the subject of I/O.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit, and may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings illustrate control lines and information lines as considered necessary for explanation but do not illustrate all control lines or information lines in the products. It can be considered that almost of all components are actually interconnected.

What is claimed is:

1. An access control system, which is formed by a computer including a processor configured to execute a process, and a memory configured to store a program for executing the process, the access control system comprising:
   a launcher which is configured to activate the process;
   an ACL file in which specifics for controlling an I/O request issued by the process are defined;
   a process search module configured to:
   acquire identification information on the process that has issued the I/O request,
   determine that the process that has issued the I/O request is an activated process that has originated from the launcher in a case where identification information on a caller process that has activated the process is the same as identification information on the launcher, and
   trace a parent of the process that has issued the I/O request and determine that the process that has issued the I/O request is the activated process that has originated from the launcher in a case where identification information on the parent process is the same as the identification information on the launcher; and
   an access control module configured to control the I/O request issued by the activated process that has originated from the launcher in accordance with the specifics defined in the ACL file,
   wherein the process is capable of being activated from the launcher when access control is to be applied to the process, and the process is capable of being originated from other than the launcher when access control is not to be applied to the process.

2. The access control system according to claim 1, wherein the access control module is configured to:
   determine a type of the I/O request;
   determine specifics for controlling I/O depending on an access destination of the I/O request by referring to the ACL file in a case where the type of the I/O request is a file I/O request; and
   determine specifics for controlling I/O depending on a communication source of the I/O request and a communication destination of the I/O request by referring to the ACL file in a case where the type of the I/O request is a network I/O request.

3. An access control method, which is executed by a computer including a processor configured to execute a process, and a memory configured to store a program for executing the process,
   the computer including: a launcher which is configured to activate the process with the processor; a process search module configured to trace a parent of the process with the processor; and an access control module configured to control an I/O request with the processor,
   the computer being configured to store an ACL file in which specifics for controlling the I/O request are defined,
   the process capable of being activated from the launcher when access control is to be applied to the process, and the process capable of being originated from other than the launcher when access control is not to be applied to the process,
   the access control method comprising steps of:
   acquiring, by the process search module, identification information on the process that has issued an I/O request;
   determining, by the process search module, that the process that has issued the I/O request is an activated process that has originated from the launcher in a case where identification information on a caller process that has activated the process is the same as identification information on the launcher;
   tracing, by the process search module, a parent of the process that has issued the I/O request and determining that the process that has issued the I/O request is the activated process that has originated from the launcher in a case where identification information on the parent process is the same as the identification information on the launcher; and
   controlling, by the access control module, the I/O request issued by the activated process that has originated from the launcher in accordance with the specifics defined in the ACL file.

4. The access control method according to claim 3, further comprising:
   determining, by the access control module, a type of the I/O request;
   determining, by the access control module, specifics for controlling I/O depending on an access destination of the I/O request by referring to the ACL file in a case where the type of the I/O request is a file I/O request; and
   determining, by the access control module, specifics for controlling I/O depending on a communication source of the I/O request and a communication destination of the I/O request by referring to the ACL file in a case where the type of the I/O request is a network I/O request.

* * * * *